United States Patent
Brown, Jr.

(10) Patent No.: US 9,696,154 B1
(45) Date of Patent: Jul. 4, 2017

(54) EASY VIEW LEVEL SQUARE

(71) Applicant: Alphonso William Brown, Jr., Baltimore, MD (US)

(72) Inventor: Alphonso William Brown, Jr., Baltimore, MD (US)

(73) Assignee: Alphonso W. Brown, Jr., Baltimore, MD (US)

( * ) Notice: Subject to any disclaimer, the term of this patent is extended or adjusted under 35 U.S.C. 154(b) by 155 days.

(21) Appl. No.: 14/121,638

(22) Filed: Oct. 2, 2014

(51) Int. Cl.
    *G01C 9/34* (2006.01)
    *G01C 9/36* (2006.01)

(52) U.S. Cl.
    CPC ..................... *G01C 9/36* (2013.01)

(58) Field of Classification Search
    CPC .................... G01C 9/34; G01C 9/36
    USPC ............................................. 33/451
    See application file for complete search history.

(56) References Cited

U.S. PATENT DOCUMENTS

| | | | | |
|---|---|---|---|---|
| 1,791,817 A * | 2/1931 | Johnston | ......... | G01B 3/566 33/340 |
| 3,225,451 A * | 12/1965 | Olexson | ......... | G01C 9/34 33/347 |
| 5,103,569 A * | 4/1992 | Leatherwood | ......... | G01C 9/32 33/343 |
| 5,535,523 A * | 7/1996 | Endris | ......... | G01B 3/566 33/371 |
| 5,713,135 A * | 2/1998 | Acopulos | ......... | G01C 15/008 33/1 PT |
| 5,832,618 A * | 11/1998 | Scarborough | ......... | G01C 9/28 33/427 |
| D432,928 S * | 10/2000 | Garrett | ......... | D10/62 |
| 6,543,144 B1 * | 4/2003 | Morin | ......... | G01B 3/02 33/27.032 |
| 6,742,271 B1 * | 6/2004 | Rushing | ......... | B25H 7/00 33/451 |
| 7,299,560 B2 * | 11/2007 | Diaz | ......... | B43L 7/005 33/451 |
| 7,963,044 B1 * | 6/2011 | Bartholomew | ......... | G01C 9/26 33/374 |
| 2004/0040169 A1 * | 3/2004 | Davis | ......... | B23D 59/002 33/640 |
| 2011/0138643 A1 * | 6/2011 | Gao | ......... | B43L 7/12 33/451 |
| 2012/0159797 A1 * | 6/2012 | Roth | ......... | B43L 7/0275 33/424 |

FOREIGN PATENT DOCUMENTS

FR 2225720 A * 12/1974 ............... G01C 9/00

* cited by examiner

*Primary Examiner* — Charlie Y Peng

(57) ABSTRACT

A tool with three tools combined in one to produce a more time consuming, efficient, and quality in leveling and squaring corners, frames, door jambs, window frames, laying bricks and masondry with cement floors or side walks. The Easy View Level Square has three unique features. One is the ability of each one of three viewing chambers to pop up perpendicular to the body of the level bar for a visual of the level bubble from any angle or short distance. The second feature is that the Easy View Level Square has a tongue blade that can open from it's trough or the body of the level bar to create a framing square useful in checking the square of corners and perpendicular structures. And the third unique feature is a ruler used for quick marks and measurements at short distances or uneven spots while checking for level to mark it.

1 Claim, 14 Drawing Sheets

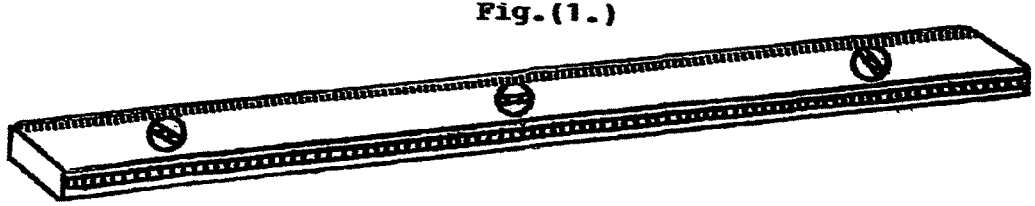
Fig.(1.)

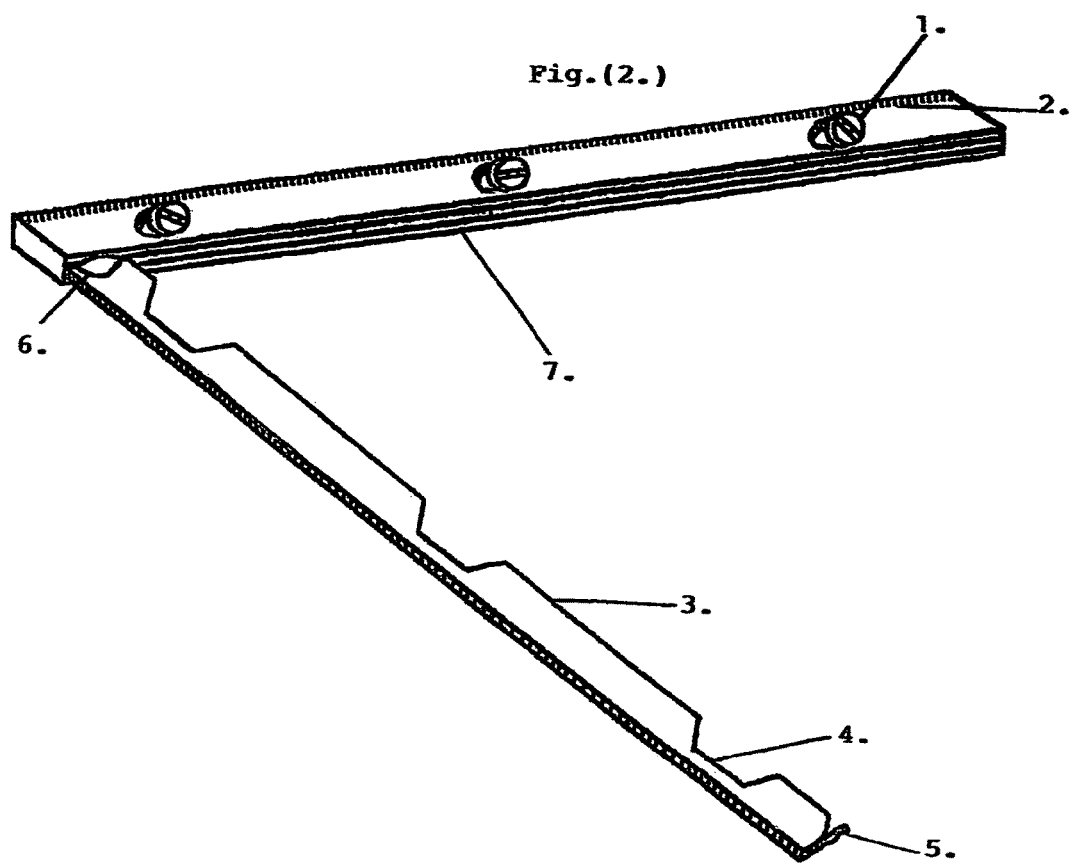

Fig.(3.)
Fig.(4.)
Fig.(5.)
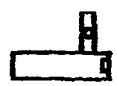
Fig.(6.)

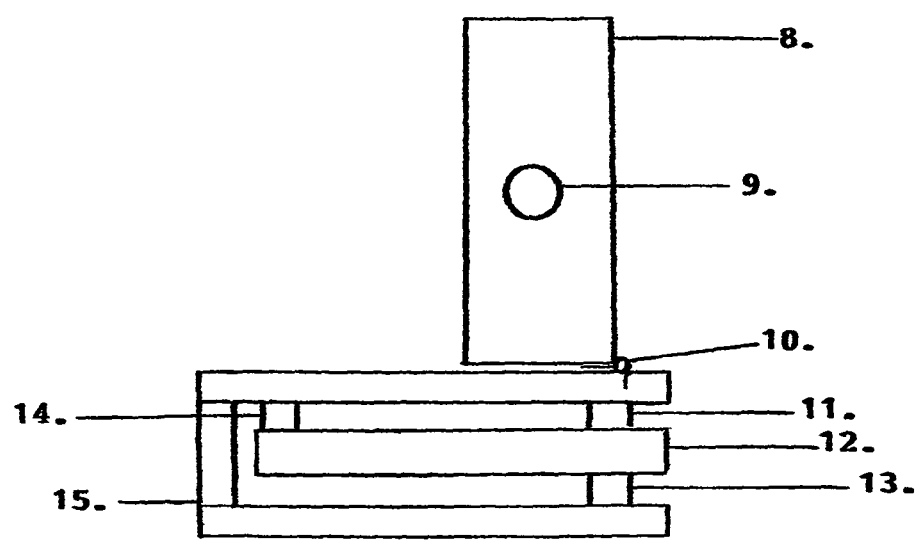

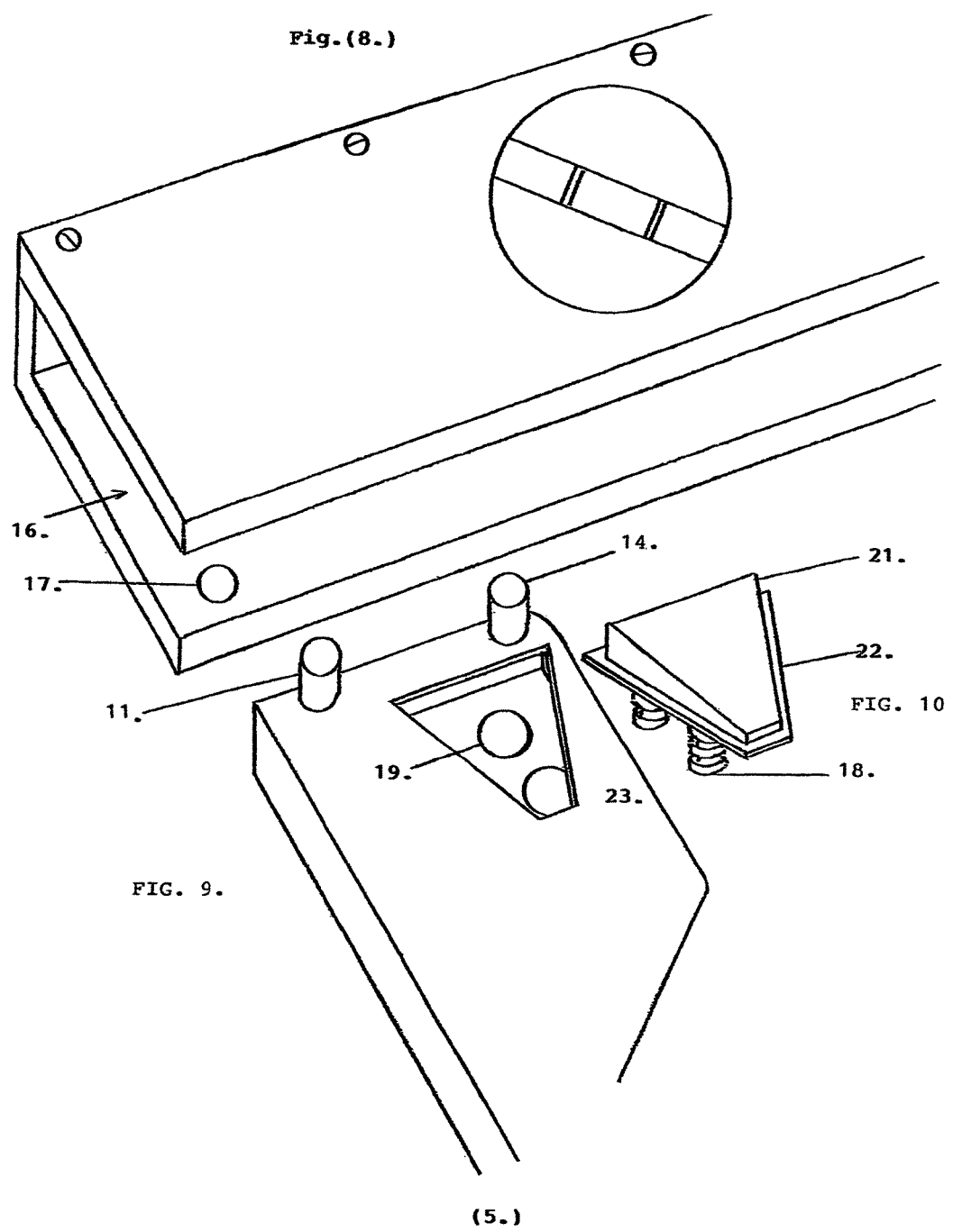

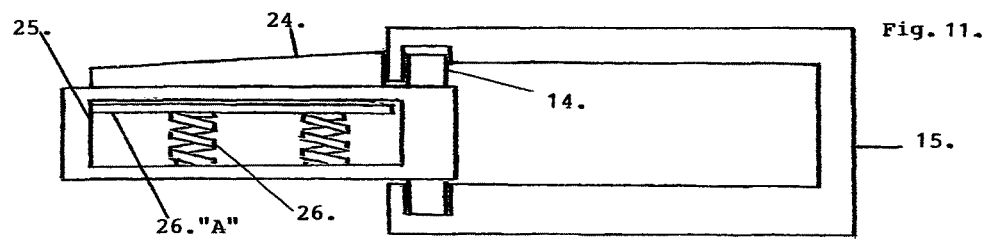
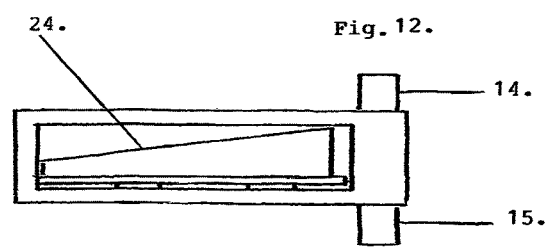
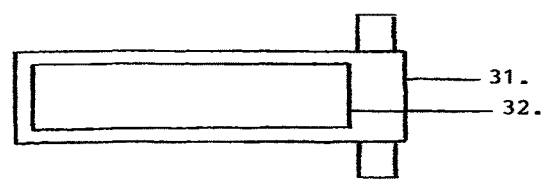
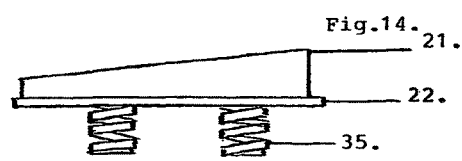

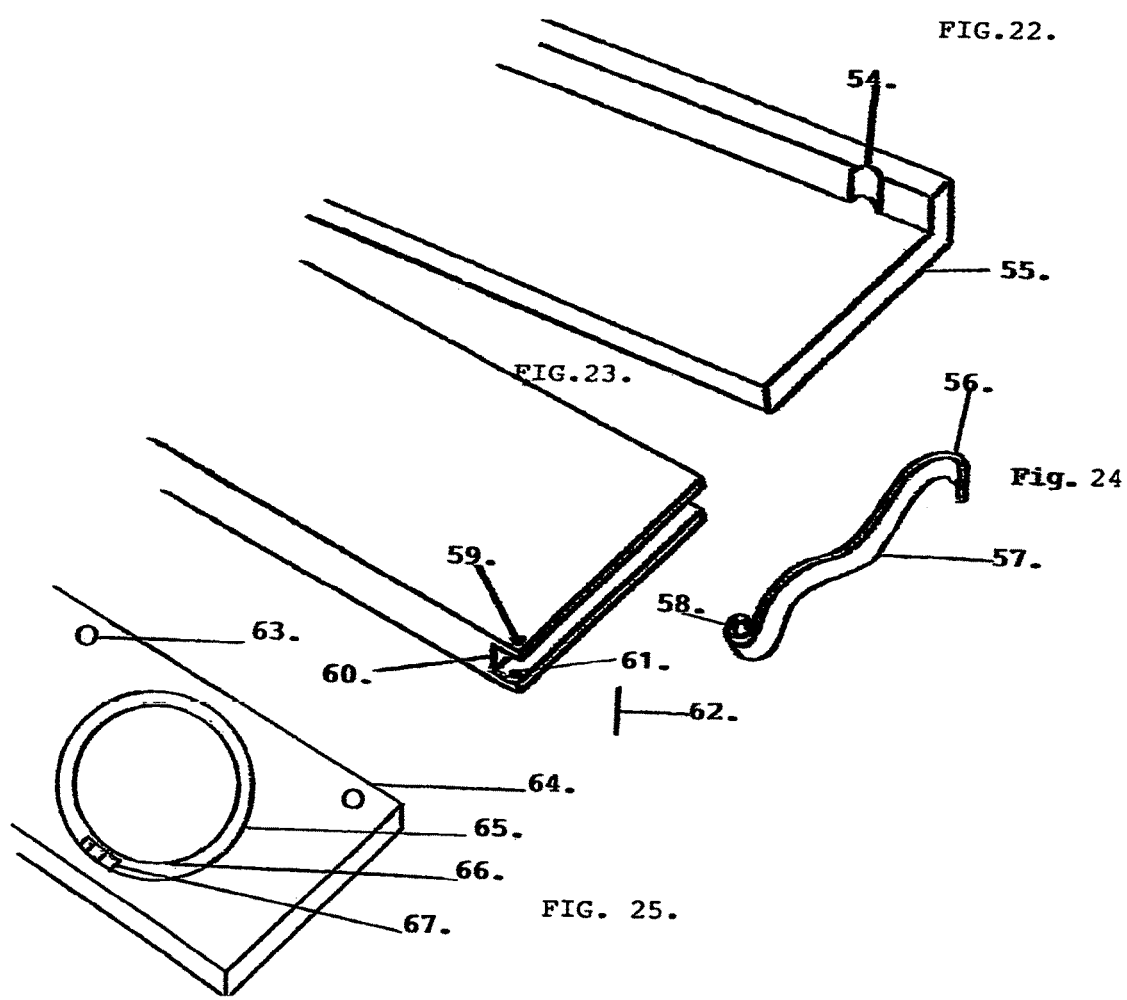

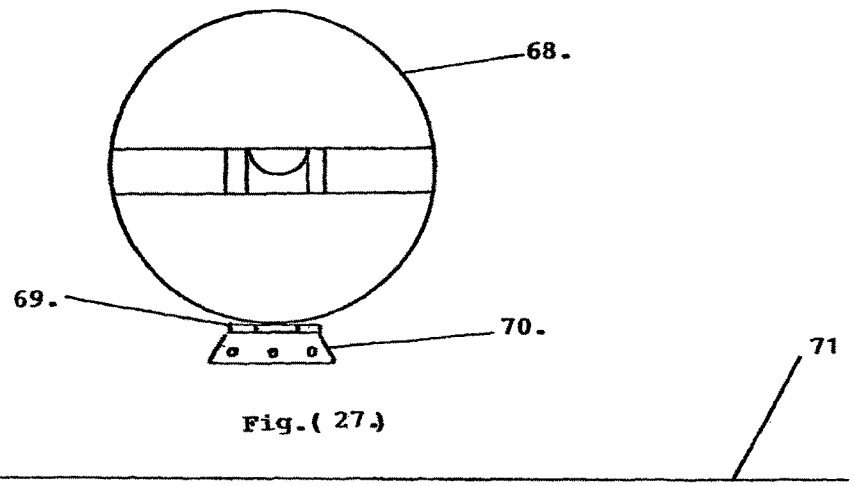
Fig(26.)
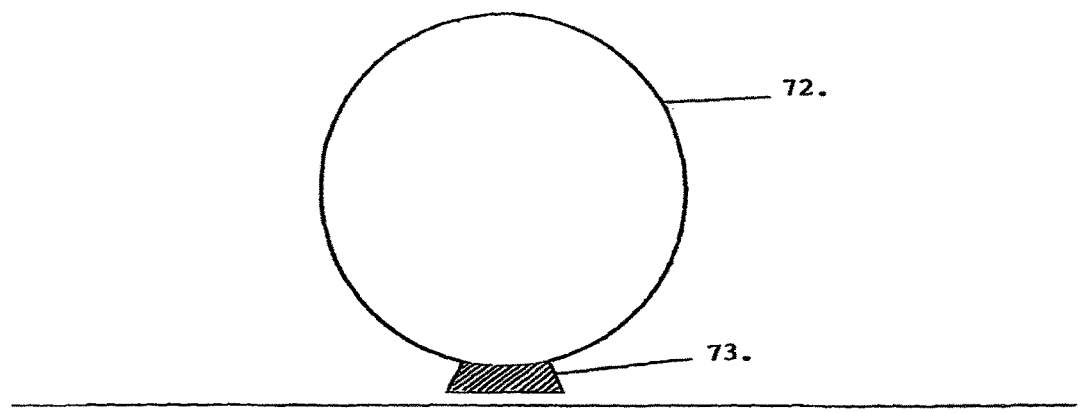
Fig.(27.)
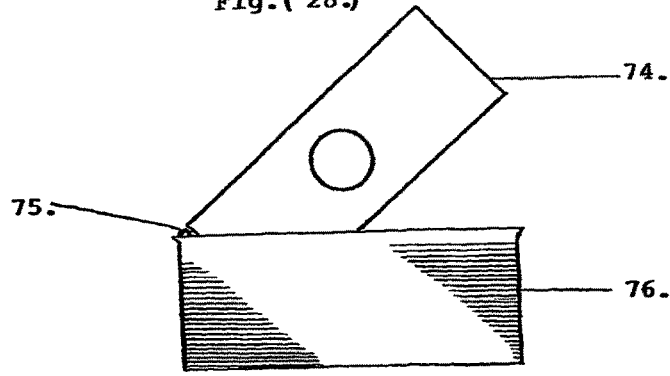
Fig.(28.)

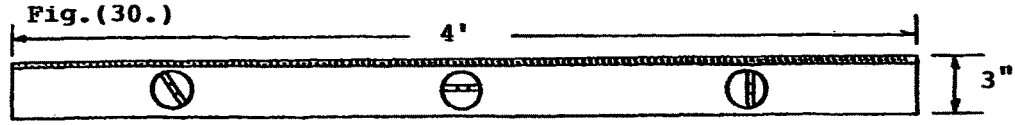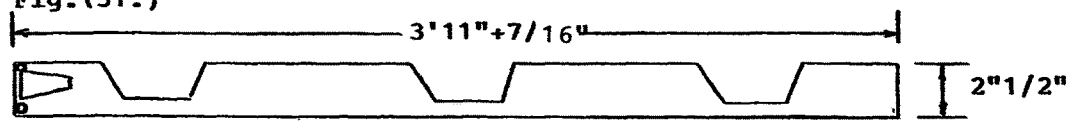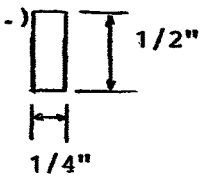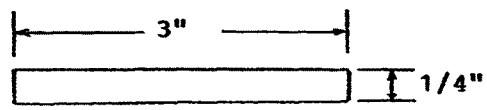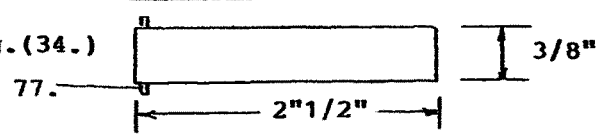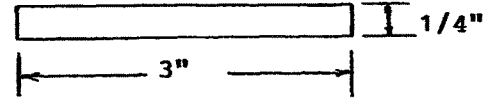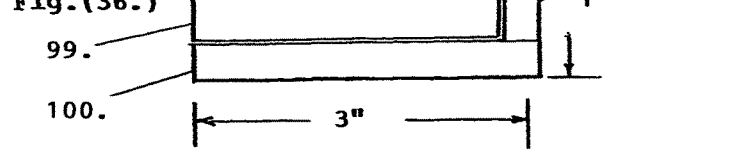

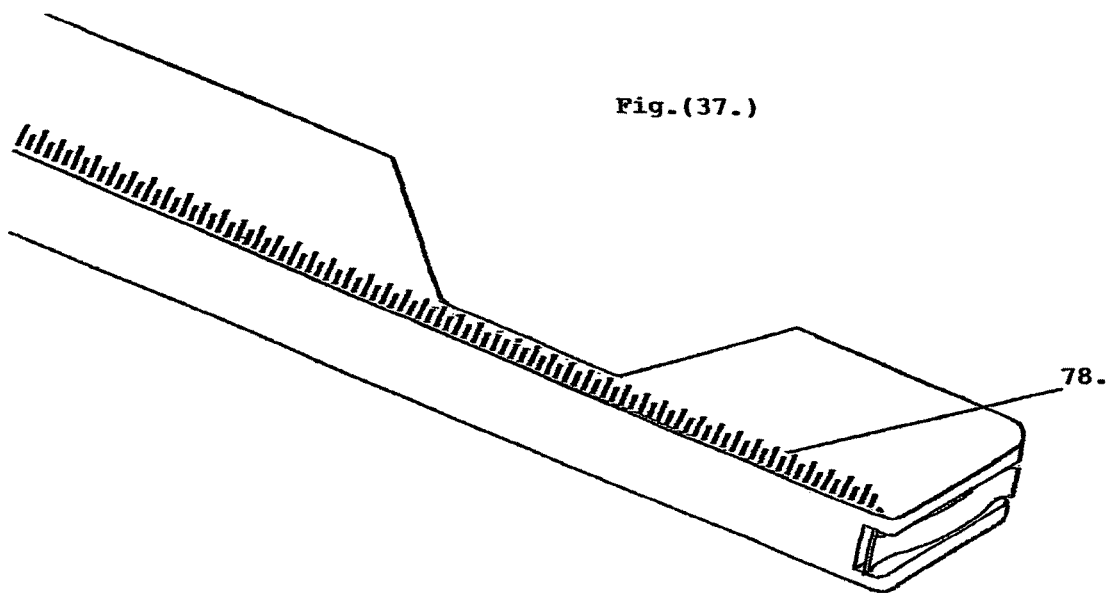
Fig.(37.)

Fig.(38.)
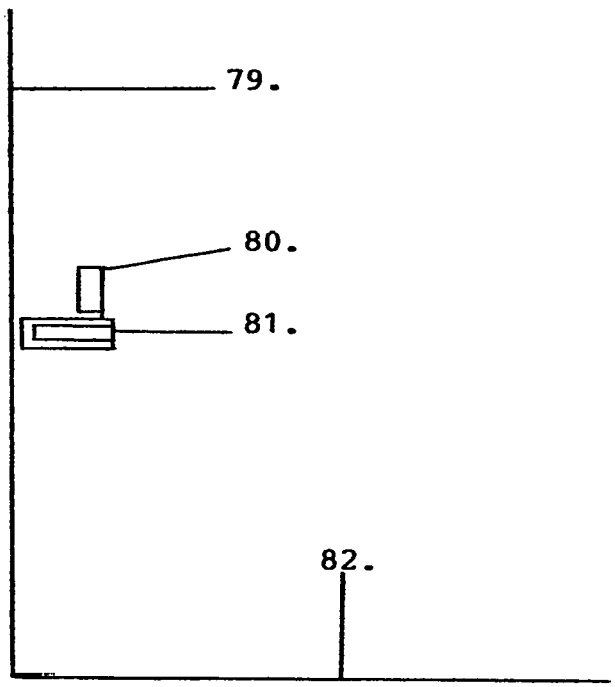
Fig.(39.)
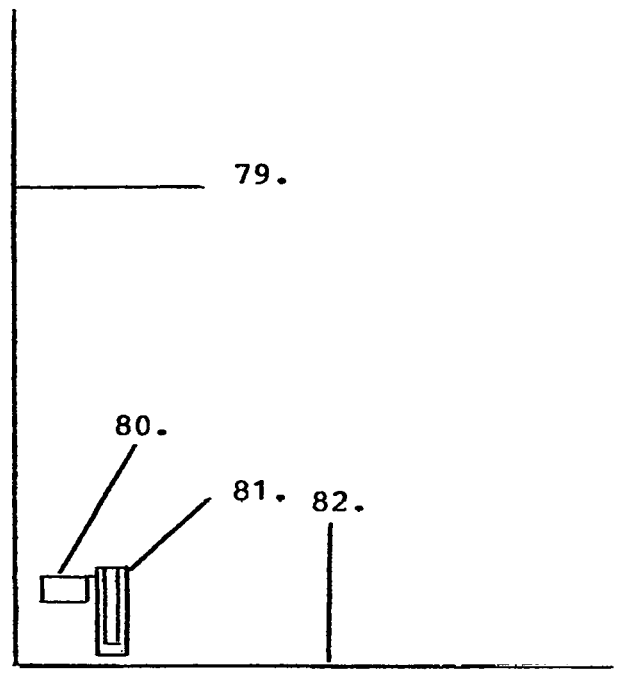

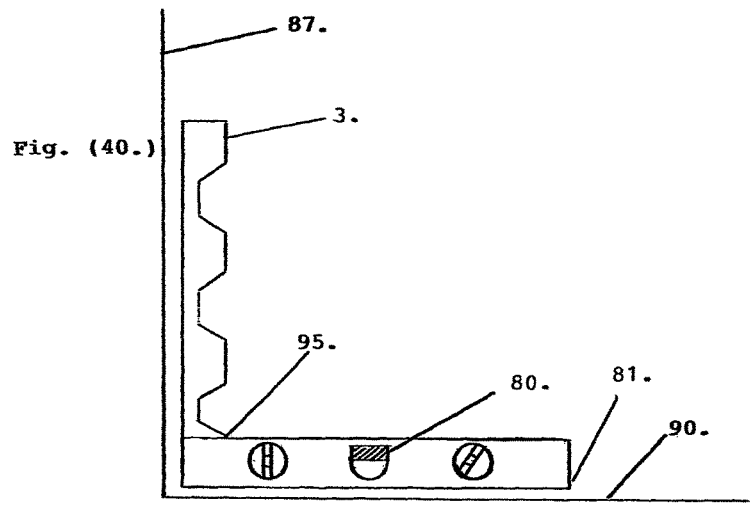
Fig. (40.)
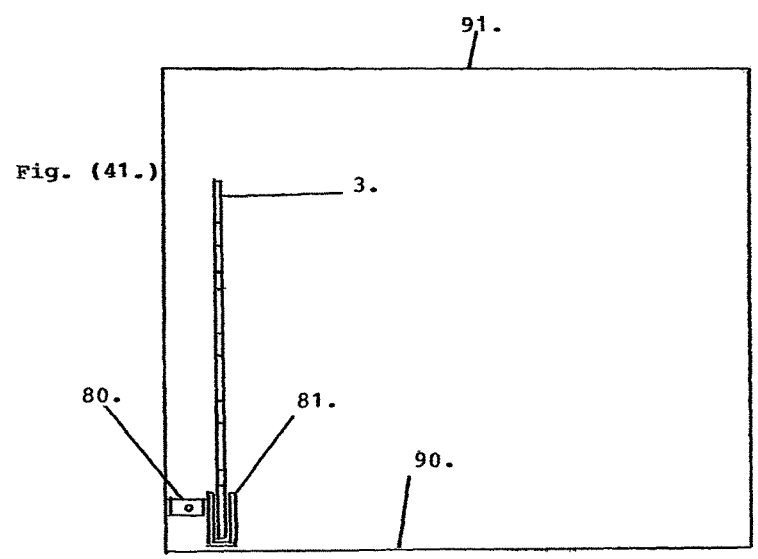
Fig. (41.)

EASY VIEW LEVEL SQUARE

FIELD OF THE INVENTION

The easy view level square is a multi purpose tool particularly relating to carpenters and construction workers in the building and renovation trade.

BACKGROUND OF INVENTION

There has been a need for multiple tools used when constructing residential buildings as houses and for constructing commercial buildings. Particularly four foot level indicators, framing squares, folding rulers, and tape measures. There are times doing construction and after the work carpenters and contractors must check in spaces where a latter is needed to reach in a high tight space to check for square as wall to ceiling and to check for level plane in a fixed position or in a confined space where the tongue blade can open to form a framing square and a handle to place the tool in a critical position to check for square and the viewing chambers can pop up out of their portholes to give accurate reading to check for level plane. The viewing chambers in the up position work just as well when the carpenter is standing to check the perpendicular square of wall to floor without kneeling down while checking for level plane at the same time without access to important tools as a level, framing square, or ruler making it difficult to perform important crucial task in order to expedite the construction process. The need for using a three in one tool simultaneously increases the time with accurate performance in squaring, leveling, and short measurements at faults at various locations to be measured and marked for correction.

OBJECT OF THE INVENTION

Principle objects of the present invention therefore are to provide a unique new three in one multi purpose tool which is compact and very convenient for carpenters and contractors producing a three in one tool with superior accuracy that saves time while performing three jobs simultaneously from one position

BRIEF SUMMARY OF THE INVENTION

The invention is a multi purpose tool that is light weight consisting of three viewing chambers as movable leveling devices with each having a bubble contained in a bowed glass tube that allows leveling of horizontal, vertical, and angle plane. The multi purpose tool includes a movable extension called the tongue blade stored in a slotted trough in the body of the level bar. The top outside edge of the level bar has a laminated ruler attached, and the tongue blade extension has an indented ruler along its outer edge.

The three viewing chambers with leveling devices have the ability to raise up out of their portholes to be perpendicular to the face of the level bar of the easy view level square so the level bubble can be easily viewed and read from various angles, fixed positions, or from a short distance as arms length. And when standing at arms length the user is holding the tongue blade as a handle after it has been extracted from its trough from the level bars body creating a framing square when locked in at a right angle to check for square comparing a standing right angle to the plane of horizon: exactly upright. And with each embodiments having a ruler, any fault or flaw can be easily measured and marked for correction as the multi purpose tool is held in the same position performing three jobs at once.

BRIEF DESCRIPTION OF DRAWINGS

FIG. 1 is a three dimensional view of the present invention.

FIG. 2 is a three dimensional view of the present invention with reference character 1. as one of three viewing chambers in its raised position, reference character 2. as the laminated ruler attached to the outer edge of the level bar, reference character 3. as the tongue blade, reference character 4. as one of three corrals that fits around each viewing chamber, reference character 5. as the snap clip, reference character 6. as the lock-latch, reference character 7. as the level bar FIG. 3 is a front view of the level bar FIG. 4 is a front view of the level bar with the three viewing chambers in their raised position FIG. 5 is a side view of the level bar with a viewing chamber in its raised position FIG. 6 is a top view of the level bar with all the embodiments in their closed position FIG. 7 is a cut away side view of the level bar and a viewing chamber in a raise position FIG. 8 is a three dimensional view of a open view of the working end of the level bar, in exploded partial view FIG. 9 is a cut away exploded partial section of the tongue blade working end FIG. 10 is the lock latch FIG. 11 is a cut away exploded view of a side view of the working end of the level bar with a open cut away view of the working end of the tongue blade in its extended position.

FIG. 12 is a exploded view cut away of the working end of the tongue blade showing its lock latch in a closed position reference character 28.

FIG. 13 is a exploded open view of the working end of the tongue blade shown without the lock latch FIG. 14 is a side view of the lock latch FIG. 15. is a blow up center section of the level bar FIG. 22 is a exploded three dimensional view of the locking end of the bottom half of the level bar FIG. 23 is a three dimensional exploded view of the locking end of the tongue blade FIG. 24 is a three dimensional exploded view of the snap clip FIG. 25 is a three dimensional exploded view of the locking end of the top half of the level bar as a top view FIG. 26 is a top view of a single viewing chamber in a exploded view FIG. 27 is a exploded top view of a porthole cut into the top half of the level bar the first option for a porthole FIG. 28 is a side view of a porthole can reference character 76. the second option to be seated in a rough cut porthole with the viewing chamber reference character 74. attached to the can.

FIG. 29 is a front of a connector strip that connects. the top half and bottom half of the level bar together leaving a storage trough FIG. 30 is a top view of the level bar with the top half and the bottom half connected with the connector strip at FIG. (29.)

FIG. 31 is a top view of the tongue blade

FIG. 32 is a side view of the connector strip that connects the top and bottom halves of the level bar with a space for the trough FIG. 33 is the side view of the top half of the level bar FIG. 34 is a side view of the tongue blade FIG. 35 is a side view of the bottom half of the level bar FIG. 36 is a side view of the level bars top and bottom halves connected with the connector strip with the tongue blade in its trough FIG. 37 is a exploded view of the locking end of the tongue blade showing its indented measurements reference character 78.

FIG. 38 is a side view of a wall and floor with a side view of the invention against the wall reference character 81.

FIG. 39 is a side view of a wall and floor with a side view of the invention against the floor with a viewing chamber in the raised position checking the level of the floor FIG. 40 is a side view of a wall and floor with a top view of the invention against the wall with the tongue blade reference character and with the level bar against the floor as the invention is in the form of a framing square checking the perpendicular square of wall to floor along with having the center viewing chamber in a raised position to check the level of the floor at the same time reference character 89. as the viewing chamber.

FIG. 41. is a side view of a wall and floor with a side view of the invention against the floor showing the raised viewing chamber reference character 93. as its checking the floor for level as the tongue blade is in its framing square position checking the front wall reference character 3.

DETAILED DESCRIPTION OF THE INVENTION

Figure 15:
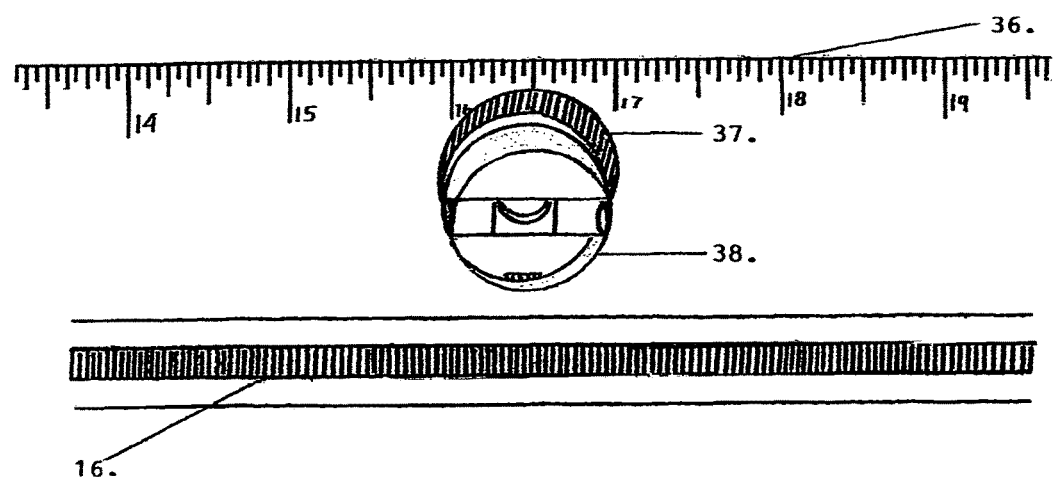
Figure 16:
FIG. 16 is the bottom view of the tongue blade FIG. 17. is the top view of the tongue blade
Figure 17:
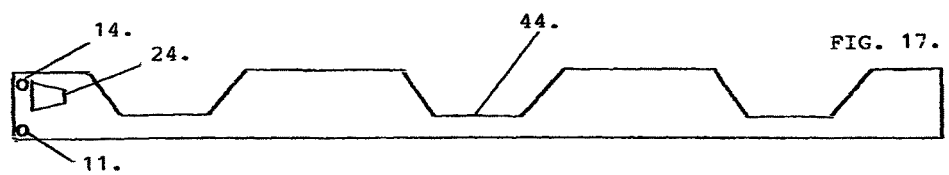
Figure 18:
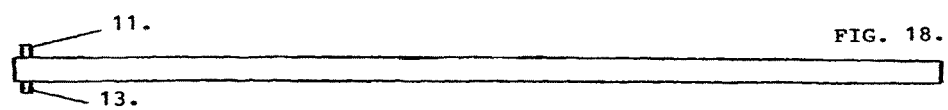
FIG. 18 is a front view of the tongue blade
Figure 19:
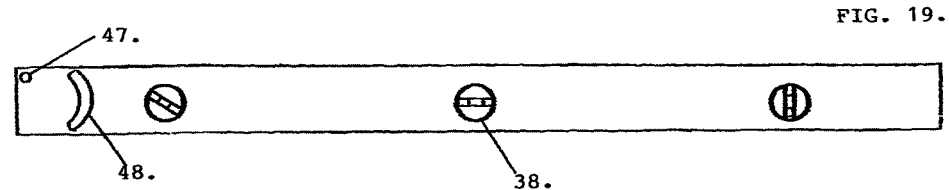
FIG. 19 is a bottom view of the top half of the level bar
Figure 20:
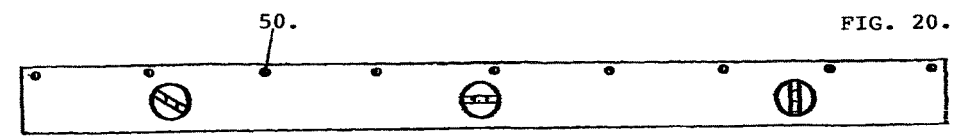
FIG. 20 is a top view of the top half of the level bar
Figure 21:
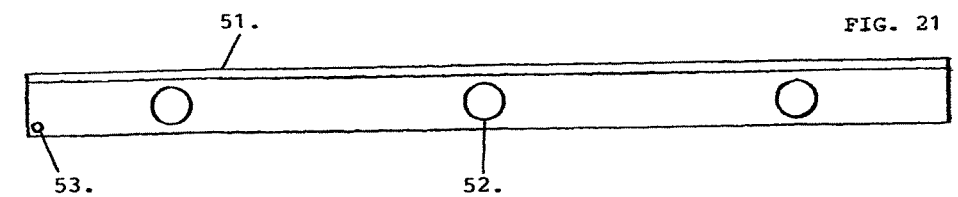
FIG. 21 is a top view of the bottom half of the level bar

Referring to the drawings in greater detail and by reference characters thereto, there is illustrated a multi purpose tool which is shown at FIG. 1. a three dimensional view of the invention shown as a traditional four foot level in its compact view FIG. 2. shows the invention in its operational form with all of its embodiments displayed, reference character 7. as the level bar, reference character 3. as the tongue blade extracted from the level bars trough, reference character 6. as the lock latch that locks and secures the tongue blade in place creating a framing square, reference character 1. as one of three viewing chambers in their raised position in order to view the level bubble from a fixed position, reference character 4. as one of three corrals designed to allow the tongue blade to close in its trough completely around each viewing chamber without any interference, reference character 5. as the snap clip that locks the tongue blade in its trough, FIG. 3. is a front view of the level bar, FIG. 4. is a front of the level bar with all three viewing chambers in their raised position, FIG. 5. is a side view of the level bar with a viewing chamber in its raised position, FIG. 6. is a top view of the level bar, FIG. 7. is a cut away side view of the level bar reference character 15. as the back of the level bar, reference character 14. as the swing pivot that allows the tongue blade to swing out while traveling in a banana canal cut under the top half of the level bar, reference character 12. as the tongue blade, reference characters 11 and 13 as the stationary pivot that pass through the outside end of the tongue blade securing the tongue blade as it swings out of its trough into position forming a framing square, reference character 8. as a viewing chamber in its raised position reference character 9. as the glass tube containing the liquid and bubble for level check reference character 10. as the hinge that moves the viewing chamber up and down in the porthole, FIG. 8. is an explode view of the working end of the level bar without the tongue blade to show the open trough that stores the tongue blade, reference character 16. as the open trough. reference character 17. as the bottom pivot hole for the stationary pivot with another pivot hole thats directly above if as the stationary pivot that extends through the tongue blade has two halves with one into the bottom pivot hole and one half into the top pivot hole the tongue blade to swing out, FIG. 9. is the working end of the tongue blade reference character 11. as the top half of the stationary pivot that extend extends completely through the tongue blade with the bottom half unseen in this diagram, reference character 14. as the swing pivot that travels in a banana canal thats cut into the bottom of the top half of the level bar that guides the tongue blade out of its trough to form the framing square, FIG. 10. is the lock latch reference character 21 as the front of the lock latch, reference character 22. as the keeper rim that prevent the lock latch from coming out of its compartment in the tongue blade, reference character 24. as one of three springs that operate the lock latch FIG. 9. the working end of the tongue blade, reference character 23. as the lock latch compartment, and reference character 19. as one of three seat holes for the three operating springs of the lock latch, FIG. 11. is a cut away exploded view of the working end of the tongue blade as it leaves the storage trough guided by the swing pivot reference character 14, traveling in the banana canal as the lock latch reference character 24, is released by the swing out of the tongue blade as the springs reference character 26 one of three springs force the lock latch into position as the keeper rim reference character 22. prevents the lock latch from coming out of its compartment reference character 25. then reference character 15 as the back of the level bar, FIG. 12. is a exploded side view of the working end of the tongue blade before the release of the lock latch showing its closed position reference character 24. as the lock latch, reference character 14 as the swing pivot and reference character 13. as the bottom half of the stationary pivot, as the top half is unseen because its directly behind the swing pivot in this diagram, FIG. 13. is a exploded side view of the working end of the tongue blade reference character 31. and reference character 32. as the compartment for the lock latch, FIG. 14. is a exploded view of the lock latch outside its compartment reference character 21. as the front of the lock latch, reference character 22. as the keeper rim and reference character 35. as one of three springs, FIG. 15. is a exploded center view of the level bar center showing one of three portholes reference character 37. and reference character 38. as one of three viewing chambers with this one in its raised position, reference character 16. as the storage trough, and reference character 36. as the laminated ruler attached to the level bars outside edge, FIG. 16. is the bottom view of the tongue blade reference character 13. as the bottom half of the stationary pivot, FIG. 17. is the top view of the tongue blade reference character 24. as the lock latch, reference character 14 as the swing pivot, reference character 11. as the top half of the stationary pivot and reference character 44. as one of three corrals, FIG. 18. is a front view of the tongue blade reference character 11. as the top half of the stationary pivot and reference character 13. as the bottom half of the stationary pivot, FIG. 19. is a bottom view of the top half of the level bar reference character 47. as the pivot hole for the top half of the stationary pivot, reference character 48. as the banana canal for the swing pivot to travel in as the tongue blade is pulled out of its trough, reference character 38. as the center viewing chamber, FIG. 20. is a top view of the top half of the level bar reference character 50. is one of a series of pre drilled holes for screws to pass through a connecting strip into the bottom half of the level bar connecting the three parts together as the connecting strip helps to create a space between the top half and the bottom half that is the trough, FIG. 21. is a top view of the top of the bottom half of the level bar, reference character 51. as the connecting strip that connects the bottom half of the level bar to the top half of the level leaving a space called the trough, reference character 53. as the bottom pivot hole for the bottom half of the stationary pivot, and reference character 52. as one of three portholes for the viewing chambers, FIG. 22. the exploded locking end of the bottom half of the level bar reference-character 55 reference character 54. as the keeper well cut into the connecting strip that connect's the top and bottom half of the level leaving a trough, the keeper well will accept the sharp curved end of the snap clip that is at FIG. 24. the snap clip reference character 56. as the sharp curved end that snaps into the keeper well cut in the connector strip that will lock the tongue blade in its trough and to release or unlock the snap clip push the bow bend of the snap clip at reference character 57. the center bow, and to release or open the snap clip push the center bow in and the sharp curved end will release from the keeper well easily because the snap clip is made of high tension thin metal and is very flexible to operate, as its back end is very tightly coiled partially closed leaving a small hole that will allow a hinge pin to be inserted FIG. 24. reference character 58. as the tight coiled end to be connected in the cradle of the locking end of the tongue blade reference character 60. as the cradle, reference character 59. as the top pin hole of the cradle and reference character 61. as the bottom pin hole, the tight coiled end of the snap clip reference character 58. will fit in the cradle between the top and bottom pin holes and secured by a hinge pin reference character 62. that allows the snap clip to swing freely in and out of its cradle, FIG. 25. is the top half of the level bar reference character 64. reference character 63, is one of a series of pre drilled holes for screws to attached the top half to the connector strip and to the bottom half of the level bar, reference character 65. as a porthole on the locking end of the level bar, reference character 66. is a viewing chamber, reference character 67. as the hinge for the viewing chamber to raise up and down in the porthole, and reference character 66. "A" as the glass tube that contains the liquid and the viewing bubble to check for level. The viewing chamber can be connected to the porthole by two options or methods. The first is shown at FIG. 27. a porthole cut into the top half of the level bar reference character'72. and reference character 73. as a mortised slot for the hinge of the viewing chamber, FIG. 26. is the viewing chamber for a porthole cut into the top half reference character 68. as the viewing chamber, reference character 69. as its hinge and reference character 72. as the hinge for the mortised slot. The other option or method is FIG. 28. is a viewing chamber with its can reference character 74. as the viewing chamber, reference character 76. as its can attached with a hinge reference character 75. and together they are placed in a porthole with a strong permanent adhesive. Drawing sheet 11. shows the approximate size of the embodiments and their assembly, FIG. 29. is the connection strip that joins the top and bottom halves of the level bar crating a storage trough, with the width as four feet and approximately ⅜"th to ¼" thick, FIG. 30. is a top view of the top half of the level bar with the bottom half the exact same size and unseen in this diagram, with the two four feet wide and 3" deep, FIG. 31. is a top view of the tongue blade thats approximately 3"11"+⅞" wide and 2"½" deep, FIG. 32 is the side view of the connector strip thats ½" high and approximately ¼" to ⅜th of an inch thick FIG. 33. is the top half of the level bar approximately ¼" thick, FIG. 34. is a side view of the tongue thats approximately ⅜" th of an inch thick and 2"½" deep, FIG. 35. is a side view of the bottom half of the level bar approximately ¼" thick and 3" deep, FIG. 36. is the assembly of the easy view level bar that is approximately 1" thick and 3" deep, FIG. 37. is an exploded view of the locking end of the tongue blade to show the indented ruler along its outer edge reference character 78. FIG. 38. is a side view of a wall reference character 79. as the wall and reference character 82. as the floor, reference character 81. as the level bar held against the wall at arms length, as the worker has the viewing chamber in a raised position in order to better read the level bubble reference character 80. as the raised viewing chamber, FIG. 39. is a side view of a wall and floor reference character 79. as the wall and reference character 82 as the floor, reference character 81. as the level bar down on the floor reference character 81, and reference character 80. as a raised viewing chamber being read by the worker in a standing position reading the level bubble with out having to kneel down, FIG. 40. is a side view of a wall and floor reference character 87. as the wall and reference character 90. as the floor, reference character 81. as the level bar down. on the floor, and reference character 3. as the tongue blade against the wall, and reference character 95. as the position of the level bar and tongue blade creating the framing square as together they check the wall and floor for perpendicular square, and reference character 80. as the viewing chamber in its raised position as the worker can stand to not only check the wall and floor for perpendicular square but at the same time check the floor for level while standing for easy view of the level bubble, FIG. 41. is a front view of a room reference character 90. as the floor and reference character 91. as the ceiling, reference character 81. as the level bar and reference character 80. as a raised viewing chamber, and reference character 3. as the opened tongue blade checking the front wall for perpendicular square with the level checking the floor as the worker reads the raised viewing chambers bubble to see if the floor is level from a standing position performing two task at the same time, and if any irregularities are seen they can be measured by either the laminated ruler on the outer edge of the level bar or by the indented ruler on the outer edge of the tongue blade and marked at the measured fault, performing the third job using the easy view level bar.

The easy view level square is a very different and unique tool for leveling as well as for squaring up structures at the same time without stopping to take a measurement for a short distance or checking for square while under construction or repair. The easy view level square is also very compact, while resembling and still used as a conventional level. The easy view level square is made of light weight plastic and aluminum built with eight parts that include the standard level style and shape but made with four movable parts. That include three pop up viewing chambers and a movable tongue blade as shown on drawing sheet(2.) FIG. (2.) reference character 1. as one of three pop up viewing chambers and reference character 3. as the tongue blade that swings out to create a framing square. The main body of the level bar as shown on drawing sheet(2.) FIG. (2.) reference character 7. the level bar, has two parts, a top half as shown on drawing sheet(8.) FIG. (20.) is the top view of the top half, and FIG. (19.) is the bottom view of the top half, then FIG. (21.) is a top view of the bottom half. Drawing sheet(8.) shows the top view of the tongue blade at FIG. (17.) and the bottom view of the tongue blade at FIG. (16.). The tongue blade is a hollow mechanism that has three visual pivots with one acting as two with a top half and a bottom half as viewed on drawing sheet(8.) FIG. (18.) the front view of the tongue blade reference character 11. as the top half of the stationary pivot reference character 13. as the bottom half of the stationary pivot and together the top and bottom pivot act as one allowing the tongue blade to swing out of its trough to create the framing square. The stationary pivot is inserted into the end outside corner of the tongue blade as both halves of the stationary pivot has a seat hole, one for the top half thats drilled into the top section of the level bar underneath the inside as shown on drawing sheet(8.) FIG. (19.) that is the bottom view of the top half of the level bar, reference character 47. as the seat hole and FIG. (21.) that is the top view of the bottom section of the level bar reference character 53. as the seat hole for the bottom half of the stationary pivot. Both top and bottom seat holes are directly over each other for the stationary pivot to perform allowing the tongue blade to swing freely into position. That movement of the tongue blade is controlled by the swing pivot that is connected to the top inside corner at the end of the tongue blade directly across from the top half of the stationary pivot located at the top outside corner of the tongue blade, the swing pivot is at FIG. (17.) reference character 14, the swing pivot also shown on drawing sheet(8.), along with the swing pivot is the banana canal that is cut into the bottom of the top half of the level bar or underneath the top half as shown on drawing sheet(8.) FIG. (19.) the bottom view of the top half of the level bar reference character 48. as the banana shaped canal. This canal allows for the controlled movement of the tongue blade by its swing pivot as it creates the framing square for the easy view level square. This is only one of the three features of the easy view level square that along with the others together is more time saving, convenient, as well as very useful in making three operations of the job that can be performed at the same time. The position of the tongue blade when fully opened to 90 degrees creates a framing square used to square up corners, framing studs windows, and door jambs, while at the same time check the level bar to see if the horizontal or vertical has level plane to the perpendicular square as the user can level, and square at the same time while saving time and work.

When the work is complete the tongue blade is returned to its trough, which is the space between the top half and the bottom half of the level bar that stores the tongue blade as show shown on drawing sheet(5.) FIG. (8.) a exploded view of the working parts of the easy view level square, reference character 16. as the trough, that is the space between the top half of the level bar and the bottom half of the level bar. Upon closing the tongue blade into its trough and allowing for a comfortable smooth smooth fit. The tongue blade has three corrals thats cut into it as shown on drawing sheet(2.) FIG. (2.) reference character 4. as one of three corrals. These corrals allow the tongue blade to fit around each viewing chamber of the level bar as the tongue blade closes completely without any interference. And to lock and secure the tongue blade in its trough, there is a snap clip attached to the non working end of the tongue blade as shown on drawing sheet(2.) FIG. (2.) reference character 5. the snap clip used to lock and secure the tongue blade in its trough making it a conventional standard level.

The second unique feature of the easy view level square is with its three viewing chambers that can pop up individually in order to see the bubble in its cylinder thats incased inside the viewing chamber. This new feature of a level makes checking the bubble for level in the horizontal, vertical or view it from any angle to check the level from various heights and odd position as when kneeling or standing awkwardly in a fixed position for a better sight and results when checking for level. The pop up viewing chambers can be easily-popped up out of the level bar with the users finger with only a slight pressure, because the viewing chamber is held in place and operated by a small sturdy hinge as shown on drawing sheet(4.) FIG. (7.) is a cut away exploded view of the side of the easy view level square with a viewing chamber in the pop up position reference character 8, then reference character 9. as the bubble cylinder incased inside the viewing chamber, reference character 10. as the hinge that holds and controls the pop up viewing chamber, and reference character 15, as the level bar. The pop up viewing chamber is also shown as an exploded view on drawing sheet(7.) FIG. (15.) the exploded view of the center of the easy view level square showing all three of its unique new features, reference character 38. as the center pop up viewing chamber in the pop up position reference character 37. the porthole as the seat where the viewing chamber is seated when the easy view level square is being used in its conventional or regular method. And the pop up viewing chamber is also shown on drawing sheet(3.) in two views with all three viewing chambers in their popped up position at FIG. (4.) the front view of the level bar and also at FIG. (5.) a side view of the easy view level square with a viewing chamber in its pop up position as its perpendicular to the level bar. Again this unique position of the viewing chamber make it very easy for the user to view the level bubble from any angle or position, and from arms length or short distance when moving and arranging the position of the level bar. The pop up viewing chambers are well secured to the level bar by a very sturdy and strong hinge and they are not interfered with by the movement or action of the tongue blade.

The tongue blade is secured and locked in its trough with a snap clip as shown on drawing sheet(9.) FIG. (24.) is the snap clip reference character 5. as the snap clip and its closing and locking section called the center bow. The snap clip is made of a high tension thin metal strip that is shaped and formed by first at one end coiling a very tight and partially closed at that end leaving a very small hole that will allow a hinge pin to fit freely allowing for free motion of that end of the snap clip. The hinge pin will first fit through a pinhole on the end of the tongue blade as shown on drawing sheet(9.) FIG. (23.) as the tongue blade reference character 59. as the top pinhole and where the tight coiled end will fit under this pinhole directly, as a hinge pin thats shown on drawing sheet(9.) FIG. (23.) reference character 62. as the hinge pin that will pass through the top pinhole and through that tight coiled end as shown on drawing sheet(9.) FIG. (24.) the snap clip reference character 58. as that tight coiled end that creates a passage hole for the hinge pin. The center of the snap clip is shaped with a protruding bow bend as shown on drawing sheet(9.) FIG. (24.) as the snap clip reference character 57. as the bow bend that will serve two purposes, one is to disengage the locking mechanism at the top end of the snap clip that is the sharp curve as shown on drawing sheet(9.) FIG. (24.) the snap clip, reference character 56. as the sharp curve that snaps the snap clip into the keeper well as shown on drawing sheet(9.) FIG. (22.) the bottom half of the level bar, reference character 54. as the keeper well for locking the sharp curved end that will secure and lock the tongue blade in its trough. This is done as the snap clip is pushed at the center on the bow bend slightly elongates the snap clip as it aligns with the keeper well as the sharp curved end snaps into the keeper well when pressure is released from the center bow bend locking the tongue blade in its trough. To release the tongue blade from its trough press against the bow bend again slightly to elongate it in order to release the tongue blade from its trough to create a framing square. The snap clip fits snugly and with a smooth surface as well as even with the surface of the level bar when locked inside its channel as shown on drawing sheet(9.) FIG. (23.) the tongue blade, reference character 60. as the cradle that stores the snap clip when it locks and secures the tongue blade.

The third unique feature of the easy view level square is a very useful and more time saving device is a built in ruler thats laminated on the outside edge on both sides of the level bar as shown on drawing sheet(7.) FIG. (15.) is a exploded view of the center of the easy view level squares level bar, reference character 36. that is the ruler thats laminated to the edge of the level bar, the ruler is also shown on drawing sheet(2.) FIG. (2.) is a three dimensional view of the easy view level square, reference character 2. as the ruler. To save time the ruler is right there for the user or worker in order to make a quick measurement and a quick mark at a unlevel spot or any other quick necessary measurement mark without losing their place while working and needing to hold that position while leveling or squaring up a spot. And with the ruler handy without having to look around or fumble while retrieving a tape measure just for a short quick measurement. The ruler on the easy view level square is right there. The tongue also has a ruler that is very useful as well for making quick measurements and markings. And unlike the laminated ruler that covers the screw holes as it is fitted on the top edge of the level bar as shown on drawing sheet(7.) FIG. (15.) is a exploded center view of the easy view level square reference character 36. as the laminated ruler. However the ruler on the tongue blade is indented into the hollow plastic body of the tongue blade in order to prevent the ruler from being scratched or rubbed off and becoming disfigured if it was a laminate applied to the tongue blade as a ruler. This damage would occur with the constant opening and closing of the tongue blade in and out of its storage trough as the body of the tongue blade may rub against the ceiling of the storage trough. So an indentation is proper for a ruler on the tongue blade as shown on drawing sheet(12.) FIG. (37.) is a exploded view of the locking end of the tongue blade reference character 78. as the indented ruler.

The luxury of having a combination of two tools in one, with a carpenters framing square and level as one tool is to have a easy view level square. To have a more easier and better level to read that has the ability to pop up its viewing chambers is to give a worker a very easy and clearer sight of the level bubble that is in its cylinder which is contained inside the viewing chambers that are seated in the portholes of the easy view level square. The ability for the viewing chambers to pop up is shown on drawing sheet(13.) FIG. (38.) is a drawing of the wall and floor reference character 79. as a wall and reference character 81. as the side view of the easy view level square and reference character 80. as a viewing chamber in its pop up position while it is being used to check or make a perfect horizontal line as the worker conducts a very easy sight while checking for level. This unique ability of the viewing chambers to pop up makes for a more quicker, correct, and accurate reading of the level bubble. These results can also be achieved when checking the level of a floor as well thats shown on drawing SHEET (13.) FIG. (39.) the floor and wall diagram reference character 8z. as the floor then reference character 81. as the easy view level square with its front edge against the floor with its viewing chamber that checks for horizontal level in its pop up position allowing the worker to remain standing while viewing the level bubble without having to bend down or kneel down to view the viewing chamber that is reference character 80.

To further explain the operations of the easy view level square is shown on drawing sheet(14.) FIG. (40.) as a side view of a wall and floor reference character 87. as the wall and reference character 90. as the floor with the easy view level square in its operational position reference character 95. as a front view of the easy view level square being fully opened as its tongue blade is fully opened reference character 3. as it rest against the wall reference character 87. and as the body of the easy view level squares front edge rest on the floor reference character 81. with one of its three viewing chambers reference character 80. which is the center horizontal viewing chambers in its pop up position for the worker to have a view from a standing position while checking the floor for level as the tongue blade reference character 3. is in its open position checking for square. This operational position is again shown on drawing sheet(14.) FIG. (41.) as the front view of the wall and the floor with reference character 91. as the front view of the wall and reference character 94. as the front view of the floor with a side view of the easy view level square reference character 81. in its open operational position with the tongue blade reference character 3. open creating a framing square checking the square of the wall to the floor as the viewing chamber is in its pop up position reference character 80. in order to check and view the level bubble for the level of the floor from a standing position. And from this standing position the tongue blade can also be used as a tool to move the easy view level square across the floor while in this operational position as a handle to move it when checking different areas of the entire floor for level or perpendicular square as wall to floor.

There is no new matter or material included in this specification.

What is claimed is:
1. A multi-purpose tool with three tools in one comprising:
 a level bar with a slotted opening called a trough that stores a tongue blade that swings out of the trough to create a framing square to check for squaring up perpendicular corners or space that is uneven or out of square, as any fault can be measured and then marked with an indented ruler on the outside edge of the tongue blade and by a laminated ruler on the top outside edge of the body of the level bar;
 wherein the level bar has three viewing chambers in permanent portholes to check the level with three pop-up bubble levels to the planes at horizontal, vertical, and at any angle, with the viewing chambers having the ability to pop up out of the permanent porthole for easy viewing to check for level from a short distance or at arm's length as the user saves time and energy remaining in one position holding the tongue blade as the length also provides the user with the convenience of checking the level and square while viewing the three viewing chambers as multi-purpose tool is moved around, wherein each of the three viewing chambers is connected to and permanently fixed to the level bar with a to maintain the viewing chambers in the pop-up position for use in viewing until pushed back into the permanent portholes;

wherein the tongue blade is locked in position for its used as a handle for the user to stand in one position to move the multi-purpose tool around checking for level and square at the same time with one motion, as the multi-purpose tool forms a perfect square when open creating a perfect corner to fit snuggly where a floor meets a wall and where a ceiling meets the wall or in any corner.

\* \* \* \* \*